Patented Aug. 2, 1927.

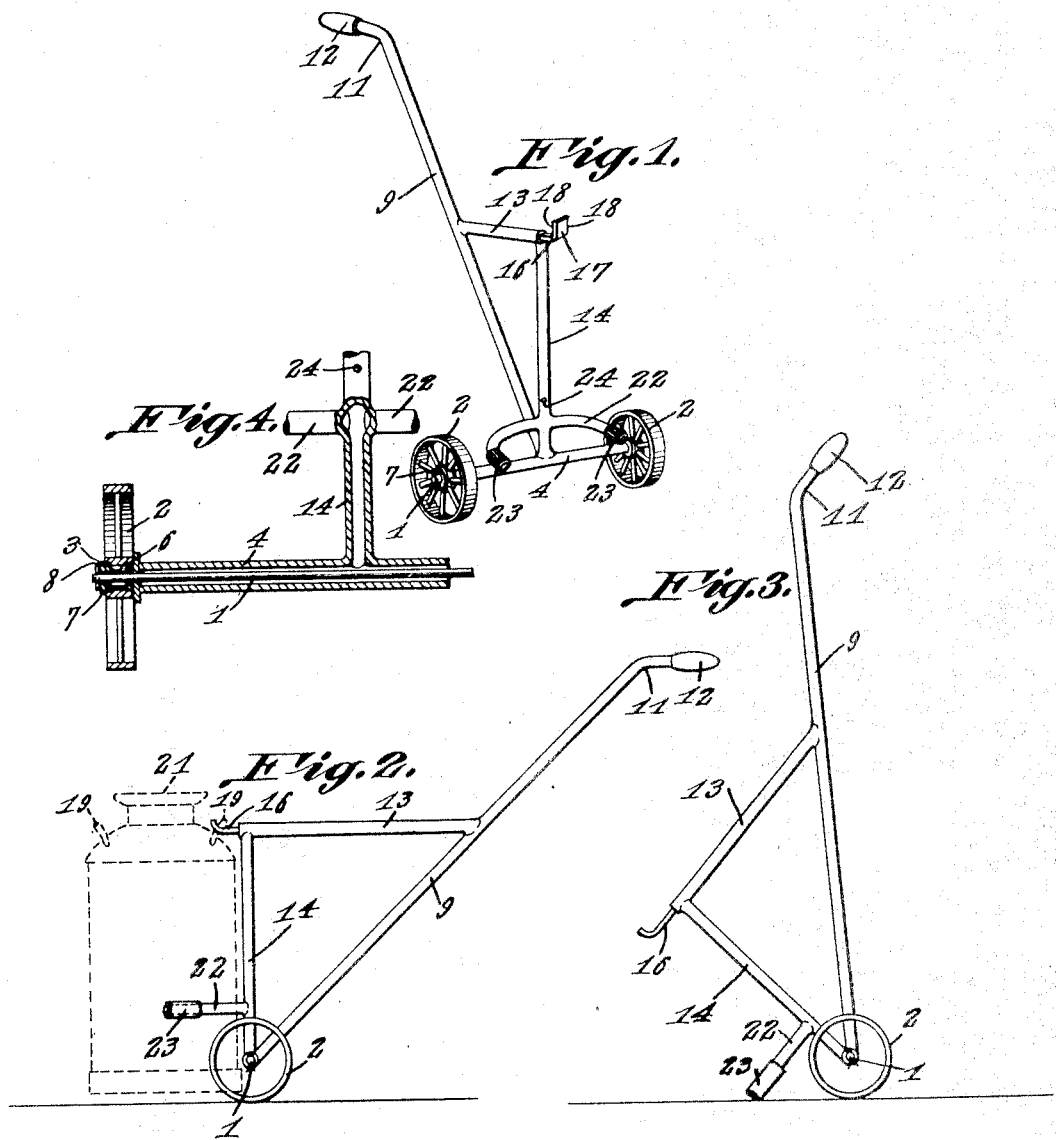

1,637,640

UNITED STATES PATENT OFFICE.

WALTER HENDRICKS, OF PENDLETON, OREGON.

HAND TRUCK.

Application filed June 19, 1923. Serial No. 646,391.

The present invention relates to improvements in hand trucks or the like, and its particular object is to provide a truck that may be conveniently used for the lifting and handling of milk cans or the like such as are commonly used in creameries and dairies. It is proposed in the present invention to provide a device that is very simple and light in construction, takes up little space and allows the can to be picked up without touching the same. A further advantage of the device is that the can during the whole operation is held in a substantially vertical position which makes it even possible to simultaneously handle two cans disposed on top of one another. A further feature of the invention is that the grip of the truck on the can is such that there is no possibility of the can becoming disengaged while the same is being moved. A further feature is that the whole device is so small that it takes up little space and may be conveniently used in crowded places. Other features and advantages of the device will appear as the specification proceeds.

The preferred form of the invention is illustrated in the accompanying drawings in which Figure 1 shows a perspective view of my truck. Fig. 2 is a side view of the same with a can supported thereon, Fig. 3 is a side view of my truck in a position of rest, and Fig. 4 a sectional detail view showing certain details of construction. While I have shown only the preferred form of the invention it should be understood that various changes or modifications may be made within the scope of the claims hereto attached without departing from the spirit of the invention. I wish to call particular attention that while my truck is particularly described as applied to the handling of milk cans or the like, it should be understood that it may be found useful in various other connections, and that it is desired in the present application to secure protection on the general principles involved rather than on the details of construction.

The axle 1 is rotatably supported in two truck wheels 2 by means of roller bearings 3. The axle housing 4 rests on the axle and is provided with two flanges 6 bearing against the wheels which latter are held against lateral motion in an outward direction by suitable washers 7 and pins 8. From the axle housing rises, preferably forming an integral part thereof, a handle 9 provided at its extreme end, which is bent as shown at 11, with a protector 12 preferably made of rubber. Formed integral with the handle and extending from the same preferably at an angle of about forty-five degrees is a rod 13, the far end of which is braced on a post 14 rising from the axle housing at the junction of the latter with the handle so that the rod 13 and the post 14 form a triangle with the handle, with the post held in a substantially vertical position, the rod 13 in a substantially horizontal position, and the handle 9 at a convenient angle when the truck is being operated. The rod 13 terminates at its free end in a grpping member 16 adapted to grip the upper portion of the can. This gripping means may be made in various different ways according to the particular shape of the can, and is shown in the drawing as comprising a flat strip of metal bent upwardly as shown at 17 and flaring outwardly as shown at 18 which is adapted to be passed underneath one of the handles 19 ordinarily provided on the milk can 21 as used at the present time. It should be understood however, that this gripping means may be adapted very readily to any other shape of can and might, for instance, comprise a fork straddling the neck of the same.

When the can is gripped by means of this member 16, and the handle pressed downwardly the can will be lifted off the ground in the same manner as if the milk can were lifted by one handle, that is, it would assume a slanting position with its center of gravity directly under the point of support. It is, however, desirable that the can be lifted without losing its vertical position so as to avoid loss of milk due to splashing, and to enable the operator to handle two cans standing on top of one another. To maintain the can in a vertical position, I provide the preferable semi-circular member 22 designed to fit over the lower end of the can and made integral with the lower end of the post. It will be seen at once that as soon as the can is lifted off the ground by means of the gripping member 16 any tendency to assume a slanting position will be counteracted by the semi-circular member 22. The latter, of course, need not necessarily be of the form shown in the drawing, but may be made in many variations so long as it is adapted to hold the can in a substantially vertical position. The ends of the semi-circular member 22 are preferably provided with the rubber sleeves 23 for the protection of the milk can.

To keep the device well lubricated I provide a hole 24 in the post 14 through which a lubricant may be introduced, which will drop through the hollow post on the axle and gradually work its way outwardly to the axle bearing.

The whole frame work of my truck is preferably made of metal tubing, the different parts formed integral with one another.

I claim:—

1. In a truck for moving milk cans and the like, a wheel supported axle, a rigid structure extending upwardly from and mounted to swing about the axis of the axle, said structure including a central post, arms diverging from the post cooperating to constitute a can embracing yoke, an elongated handle behind and fixed relative to the post extending upwardly therebeyond at an angle, a forwardly extending connection between the post and handle, and a can lifting member fixed relative to the post and extending forwardly therefrom, said member constituting means for extending under and engaging the handle of a can to lift the can when the post is swung to an upstanding position and to support the can in a vertical position along the post and within the yoke.

2. A two-wheeled barrow truck for moving milk cans and consisting of an axle, a wheel mounted on each end of said axle, a tubular housing for said axle, a single rod connected at its lower end to the middle portion of said housing and rising from said housing substantially vertically when the truck is carrying a milk can in a vertical position, a first bar for pushing said truck, said bar extending backwardly from said axle at such an angle that the truck may be readily pushed when a milk can is in vertical position on said truck, a second bar joining said first bar and said upright rod, an upturned hook extending forwardly of said upright rod adjacent the upper end thereof, and adapted to engage a handle of a milk can when the truck is tipped forward, and an arcuate rod extending forwardly from said upright rod, said arcuate rod being adapted to embrace the side of a milk can and to prevent the latter from swaying.

In testimony that I claim the foregoing as my own, I have hereto affixed my signature.

WALTER HENDRICKS.